United States Patent [19]
Kersey et al.

[11] Patent Number: 6,081,633
[45] Date of Patent: Jun. 27, 2000

[54] FIBER OPTIC SENSOR ARRAY SYSTEM WITH FORWARD COUPLED TOPOLOGY

[75] Inventors: Alan D. Kersey, FairFax Station; Anthony Dandridge, Burke, both of Va.

[73] Assignee: The United States of America as represented by the Secretary of the Navy, Washington, D.C.

[21] Appl. No.: 08/552,422

[22] Filed: Nov. 3, 1995

[51] Int. Cl.[7] ................................................. G02B 6/00
[52] U.S. Cl. ................................................................ 385/12
[58] Field of Search ................................ 385/12, 13, 24, 385/48

[56] References Cited

U.S. PATENT DOCUMENTS

| | | | |
|---|---|---|---|
| 4,778,239 | 10/1988 | Shaw et al. | 350/96.16 |
| 4,784,453 | 11/1988 | Shaw et al. | 350/96.16 |
| 5,095,514 | 3/1992 | Curtis | 385/12 |
| 5,345,522 | 9/1994 | Vali et al. | 385/24 |
| 5,365,359 | 11/1994 | Spillman | 385/12 |

*Primary Examiner*—Teresa M. Arroyo
*Assistant Examiner*—Robert E. Wise
*Attorney, Agent, or Firm*—Barry A. Edelberg; Charles J. Stockstill

[57] ABSTRACT

A forward-coupled array topology is used for a ladder-type fiber optic sensor system in which each optical path in the system includes the same total number of input and output optical fiber sections and approximately the same total number of input and output couplers and splices so that the coupler splitting ratios for optimum optical performance are independent of light losses in the system.

5 Claims, 6 Drawing Sheets

FIBER OPTIC SENSOR ARRAY SYSTEM WITH FORWARD COUPLED TOPOLOGY

BACKGROUND OF THE INVENTION

1. Field of the Invention

The present invention relates in general to multiplexed fiber optic sensor arrays with large spans (coverage) that can be used for a number of surveillance type applications, and more particularly to ladder-type sensor arrays having a forward coupled topology.

2. Description of Related Art

A wide range of network architectures for multiplexing fiber optic sensors using time and frequency division techniques have been developed. Most fiber optic sensor multiplexing architectures, or topologies, involve the use of fiber optic couplers or splitters to distribute the light to, and recombine the light returned from, the sensor elements in the array. In a typical ladder-type network, the losses in the system can become large, and the coupling or splitting ratios in the couplers or splitters require adjustment to compensate for such losses.

One form of conventional ladder network topology is the return-coupled array topology (RCAT). As shown in FIG. 1, in an RCAT ladder network, a plurality of forward-coupling fiber optic distribution couplers (power splitters) 1A are connected by first optical fiber sections 4A in series, a plurality of return-coupling fiber optic recombination couplers 1B are connected by second optical fiber sections 4B in series, a plurality of fiber optic sensors $S_1$–$S_n$ are respectively connected between corresponding ones of the first and second couplers 1A and 1B, and a further terminal fiber optic sensor $S_t$ is series connected with terminating ones of the first and second optical fiber sections 4A and 4B, respectively, as shown in FIG. 1. As shown in more detail in FIG. 2, couplers 1 are joined to the optical fiber sections 4 by splices 3; and delay coils T having a length L may be connected in series with the optical fiber sections 4.

In general, when dealing with array topologies based on an RCAT ladder network, the coupling or splitting ratios $\kappa_1$–$\kappa_N$ of the couplers 1 can be selected to equalize the power returned to a detector (not shown) from each sensor. This equalization optimizes the overall array performance in terms of signal to noise ratio. The values of the required splitting ratios $\kappa_x$ depend on the number of optical elements in an array and the light losses in the optical elements. The total number of sensors that can be supported is also determined by the light losses. The splitting ratios $\kappa_x$ for an ideal RCAT ladder network without light losses are determined by $$\kappa_x = 1/(N+1-x) \qquad (1)$$

where N is the number of input and output fiber optic couplers and x=1 to N−1.

Light losses in couplers 1, splices 3, and delay coils T reduce the optical power received from different sensors 2 unequally. The farther a sensor S is from the common input/output terminals of the array, the greater are the light losses through the optical elements because of the greater number of optical elements through which the light passes.

Because the light losses accumulate, based on the number of optical elements through which the light passes, even if the losses ~−0.1 dB, in couplers 1, splices 3, and delay coils T are the light loss for the last sensor of an eight element RCAT ladder network can total more than −5 dB. Power balancing is then achieved by lowering the coupling ratios of the initial couplers 1 in both the distribution and recombinational coupler networks. The required fractional reduction in coupling ratio depends on the losses and the position of each coupler 1 in the RCAT ladder network.

The effect of light losses in the optical elements of the RCAT ladder network can be analyzed in terms of a unit segment or section of the ladder network array that is repeated sequentially along the RCAT ladder network, for example, a unit segment associated with a sensor $S_1$ as shown in FIG. 2. The unit segment includes the sensor $S_1$ (e.g., a hydrophone), the associated distribution and recombination couplers 1A and 1B, delay coil T of length L, connecting sections of optical fibers 4, and the associated splices 3 as indicated. The losses in the couplers 1, splices 3, delay coils T, and the total length of the connecting optical fiber sections 4 are denoted $\gamma_c$, $\gamma_s$, $\gamma_d$, and $\gamma_l$, respectively. The losses $\gamma_d$ of each delay coil T can be expressed as $\gamma_f L$, where $\gamma_f$ is the light loss of the optical fibers per unit length and L is the length of the delay coil T. Typically, the length of delay coil T may be ~25 m, much greater than the length of the connecting optical fiber sections, and therefore the light loss $\gamma_l$ may be so small as to be ignored. In that case, the total loss of each coupler and its associated splices and delay coil is given by the equation $$\gamma = \gamma_c + 2\gamma_s + \gamma_f L \qquad (2).$$

However, in certain applications, an RCAT ladder array may require sensor spacing of 100 m to kms, in which case the loss in the connecting fibers can dominate the other light losses in determining the required coupling ratios. Therefore, in those application, the light loss $\gamma_l$ cannot be ignored.

FIG. 3 shows the required coupling ratios, determined by numerical analysis, for a sixteen sensor RCAT ladder array with optical elements having different light losses. The bold curve, with squares designating the array sensors, shows the coupler splitting ratios for the ideal "lossless" case. The curves with triangle and circle sensor designations show the required coupler splitting ratios for coupler, splice and link losses of −0.3 dB and −1.0 dB, respectively, associated with each sensor.

The effective throughput per sensor channel within the RCAT ladder array assembly, which can be calculated using the data of FIG. 3, are shown in FIG. 4. Of the total effective sensor loss shown in FIG. 4, −0.3 dB is due to the output coupler of the sensor. On a time averaged basis, only 50% of the optical power from a sensor is directed to the output port coupled to the series of recombination couplers. The bold curve, with squares designating the array sensors, shows the optical throughput per sensor channel for the ideal "lossless" case without coupler, splice and link losses. The curve in FIG. 4 with triangle sensor designations shows that for a sensor loss of −1 dB, and coupler, splice and link losses of −0.3 dB, the effective optical throughput per sensor channel is approximately −34 dB. The curve with circle sensor designations shows that adding a fiber link loss of −0.7 dB, which corresponds to a 2 km spacing at an optical wavelength of 1.3 μm, decreases the optical throughput per sensor channel to −50 dB.

With the coupler splitting ratios selected according to FIG. 3, efficient power distribution/recombination of the sensor signals within the array is achieved. In response to the input optical pulse, the array produces a set of N equal magnitude output pulses separated by the sensor-sensor delay period.

As indicated in FIG. 3, the RCAT ladder network requires that the coupler splitting ratio of each coupler be chosen to compensate for light losses of the various optical elements.

Additionally, the couplers near the input/output end of the array must have very low coupler splitting ratios, which is difficult to achieve with a small tolerance. Errors in those splitting ratios cause errors in the optical throughputs of all the sensor channels farther away from the input/output of the array.

SUMMARY OF THE INVENTION

It is an object of the present invention to provide a fiber optic sensor array system having a topology wherein the coupler splitting ratios required for optimum performance do not depend on the system losses.

It is also an object of the present invention to provide a fiber optic sensor array system using couplers with a minimum coupling ratio larger than that of an RCAT ladder network with the same number of sensors, to avoid problems of achieving very small coupling ratios precisely.

It is a further object of the present invention to provide a fiber optic sensor array system that is highly suitable for operation in remote regions.

To achieve the above and other objectives, the present invention uses a forward-coupled fiber optic sensor array system topology (FCAT) that provides a significant improvement in system performance for a time-division multiplexed array based on a ladder network of sensor elements. The FCAT ladder network does not require adjustment of system coupling ratios to compensate for losses, and is suited for applications requiring remotely operated fiber optic arrays.

DETAILED DESCRIPTION OF PREFERRED EMBODIMENTS

Figure 5:
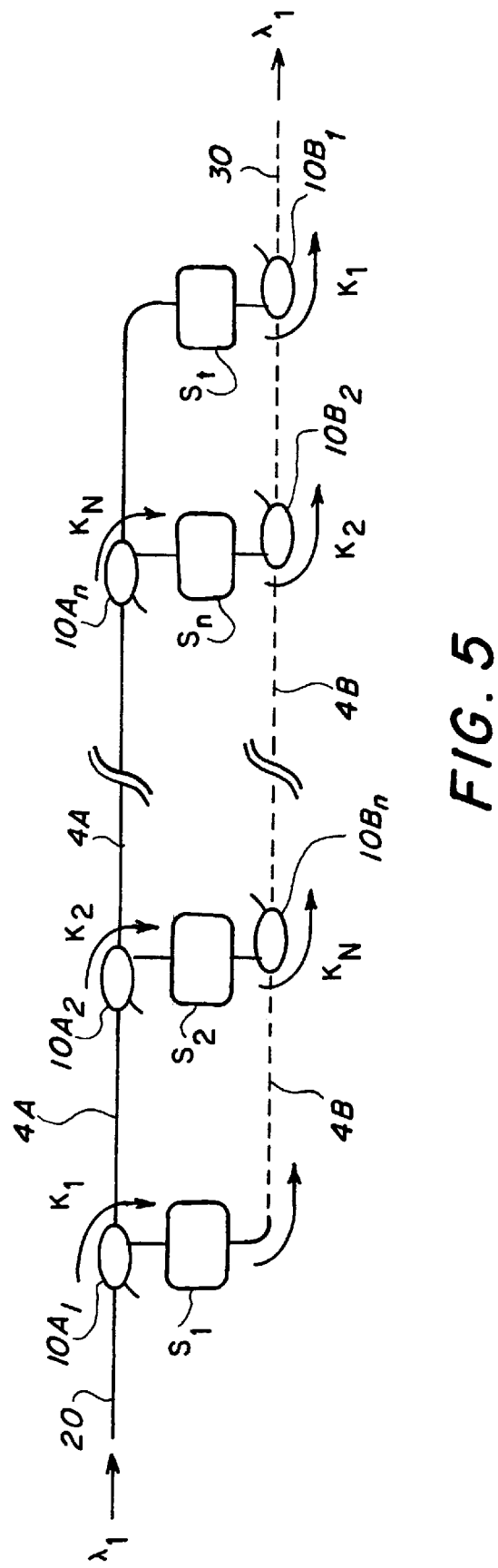
FIG. 5 is a diagram of a forward coupled array topology (FCAT) sensor array according to the present invention.

As shown in FIG. 5, an FCAT ladder network fiber optic sensor array according to the present invention includes a plurality of input (distribution) fiber optic couplers 10A connected in series by first optical fiber sections 4A. The initial input coupler $10A_1$ has its input connected to an input optical fiber section 20. Each input coupler 10A divides the input light between a sensor S and the next downstream input coupler 10A, except for the last input coupler $10A_n$ in the array, which divides the received light between sensor $S_n$ and a terminal sensor $S_t$. Additionally, a plurality of output (recombination) fiber optic couplers 10B are connected in series by second optical fiber sections 4B. The terminal output coupler $10B_n$ has its output connected to an output optical fiber section 30.

As shown in FIG. 5, in an FCAT ladder network array according to the present invention, all of the optical paths defined between the input and output optical fiber sections 20, 30 by input and output couplers 10, first and second optical fiber sections 4 and sensors S have the same number of optical fiber sections and approximately the same number of optical connections. Consequently, unlike the RCAT ladder network, where light losses change the required splitting ratios of each node in the array, in the FCAT ladder network, the same system optical losses are seen by all the sensors, and the distribution and recombination coupler splitting ratios do not have to be tailored to compensate for the losses. That is, unlike the RCAT ladder network, the coupler splitting ratios required for optimum performance of FCAT ladder network do not depend on the system losses.

Accordingly, the splitting ratios advantageously are selected based on the ideal "zero-loss" case, where equal power is returned from each sensor element in the array when the coupler splitting ratios are set according to equation (1). This eases the tolerances on the splitting ratios and improves the uniformity of sensor output levels.

Figure 1:
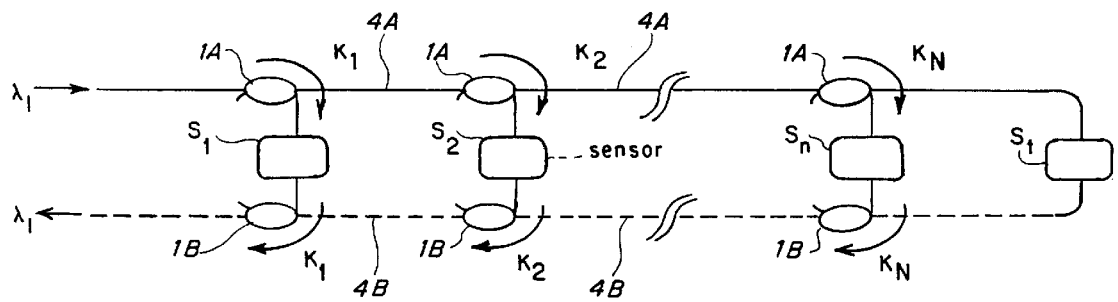
FIG. 1 is a schematic diagram of a conventional return coupled array topology (RCAT) fiber optic ladder network sensor array.
Figure 2:
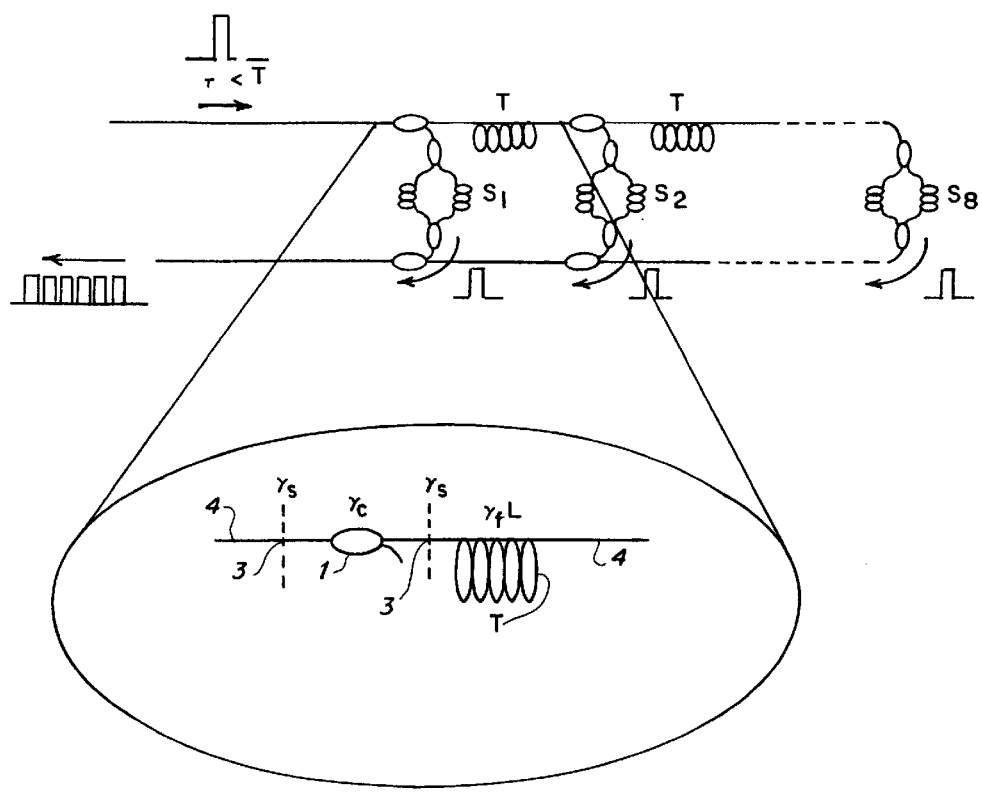
FIG. 2 is a more detailed schematic diagram of the RCAT sensor array shown in FIG. 1, and including an enlargement of a segment of the array.
Figure 3:
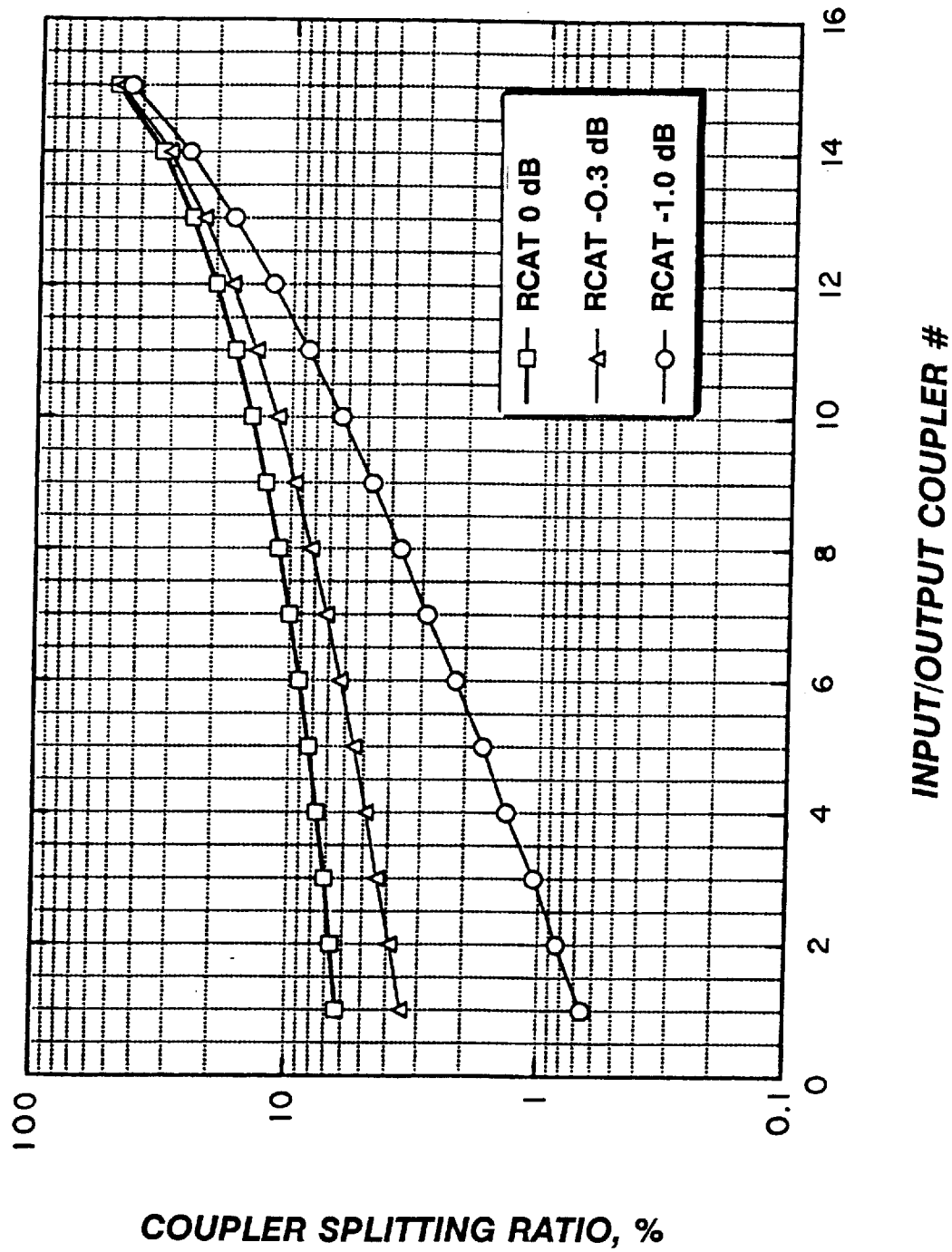
FIG. 3 is a graph of the required coupler splitting ratios for efficient power distribution and recombination of sensor signals for a sixteen sensor RCAT ladder network for each of three values of system losses.
Figure 4:
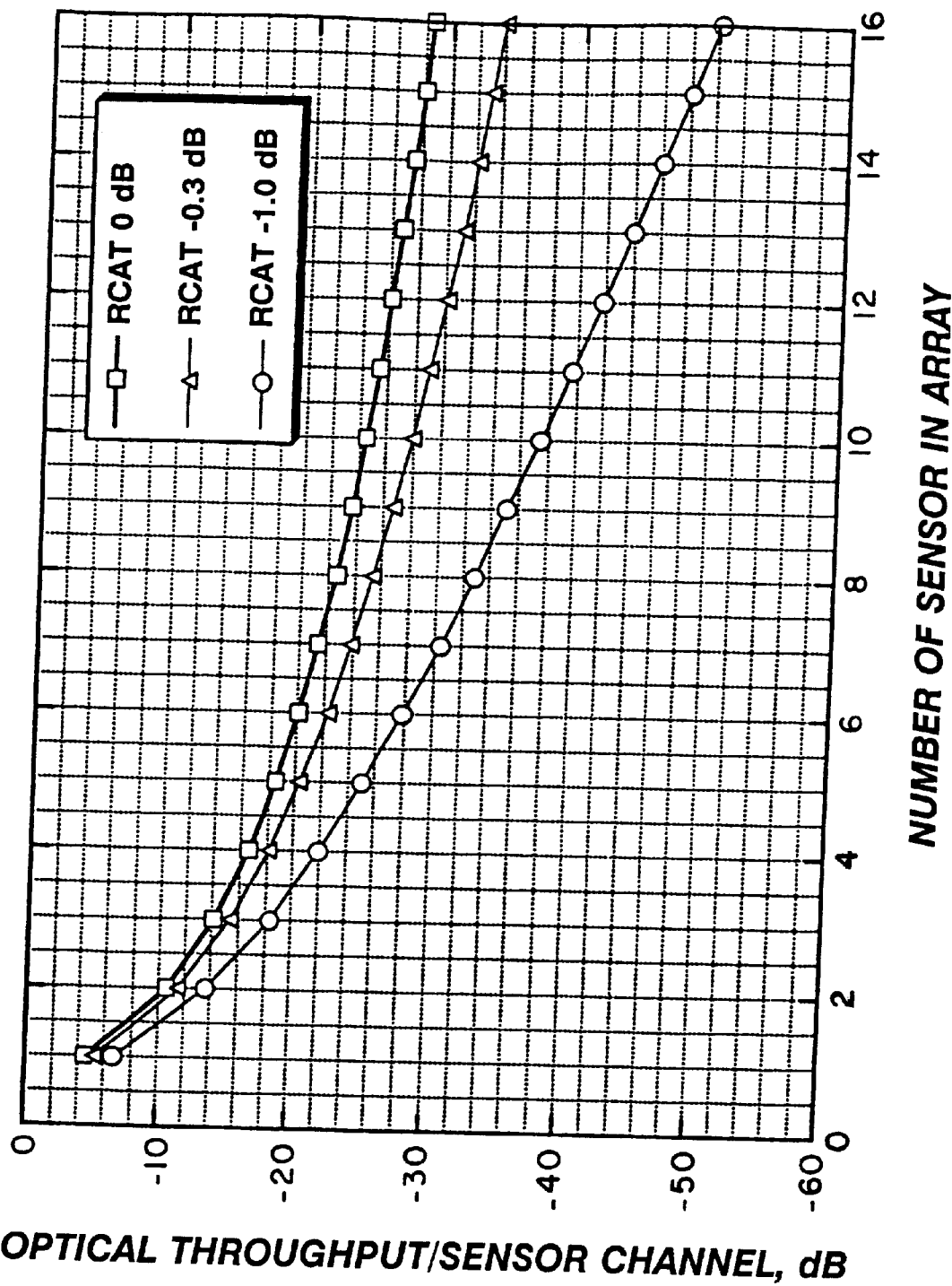
FIG. 4 is a graph of optical throughput per sensor channel for an RCAT ladder network having the coupler splitting ratios shown in FIG. 3.
Figure 6:
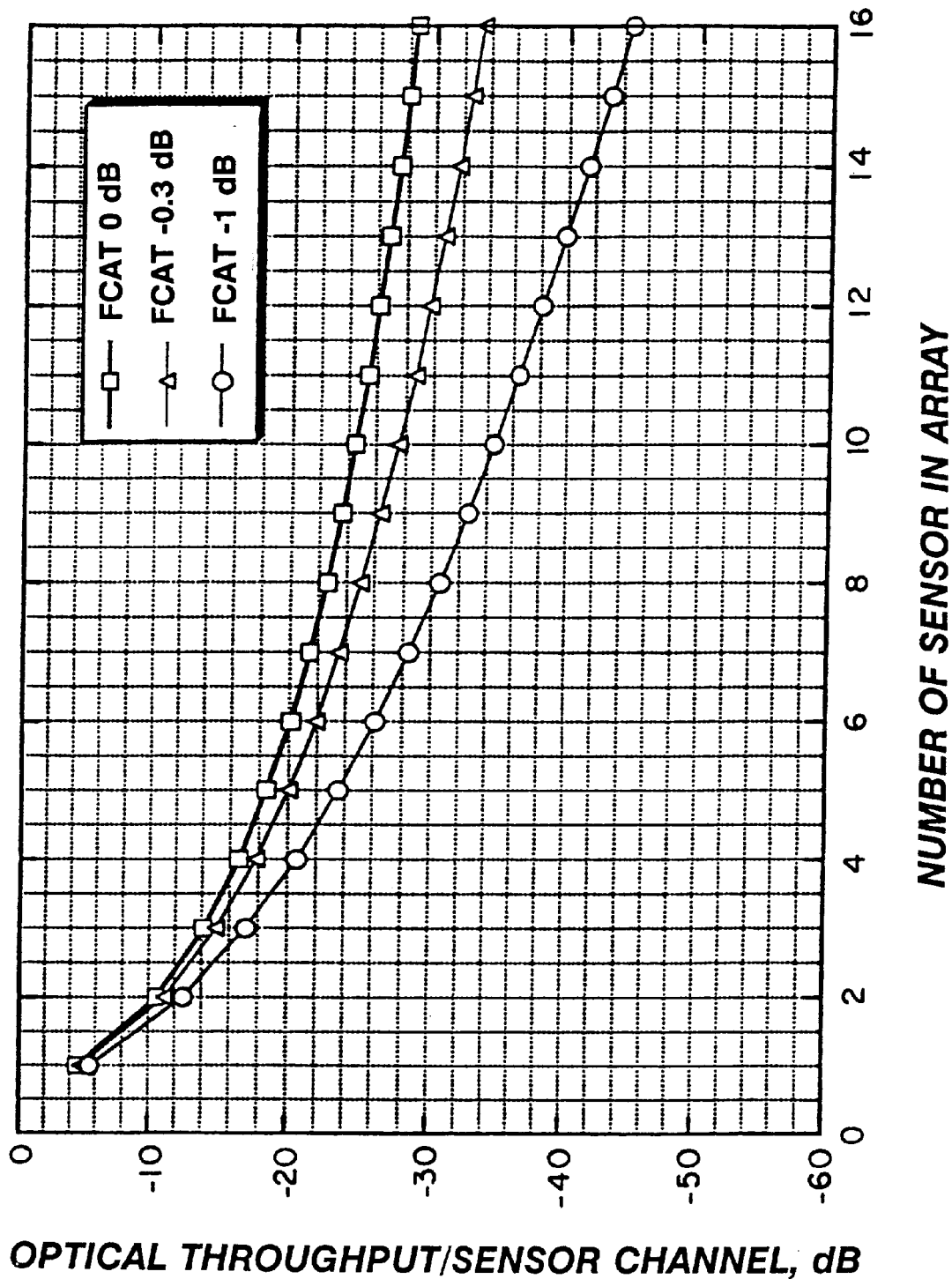
FIG. 6 is a graph of optical throughput per sensor channel for both an RCAT ladder network and for an FCAT ladder network according to the present invention for each of three different values of system losses.

With reference to FIG. 6, the calculated optical throughput per sensor channel for each sensor location of the FCAT system for various system losses (the same as those used for the illustrative RCAT system data shown in FIG. 4) is shown. Comparing the data in FIG. 4 and FIG. 6, it can be seen that for a given number of sensors, the optical throughput per sensor is generally better in the FCAT configuration than in the RCAT configuration. This is most marked at larger sensor counts (longer array spans), and thus leads to improved capabilities over the prior RCAT systems.

Figure 7:
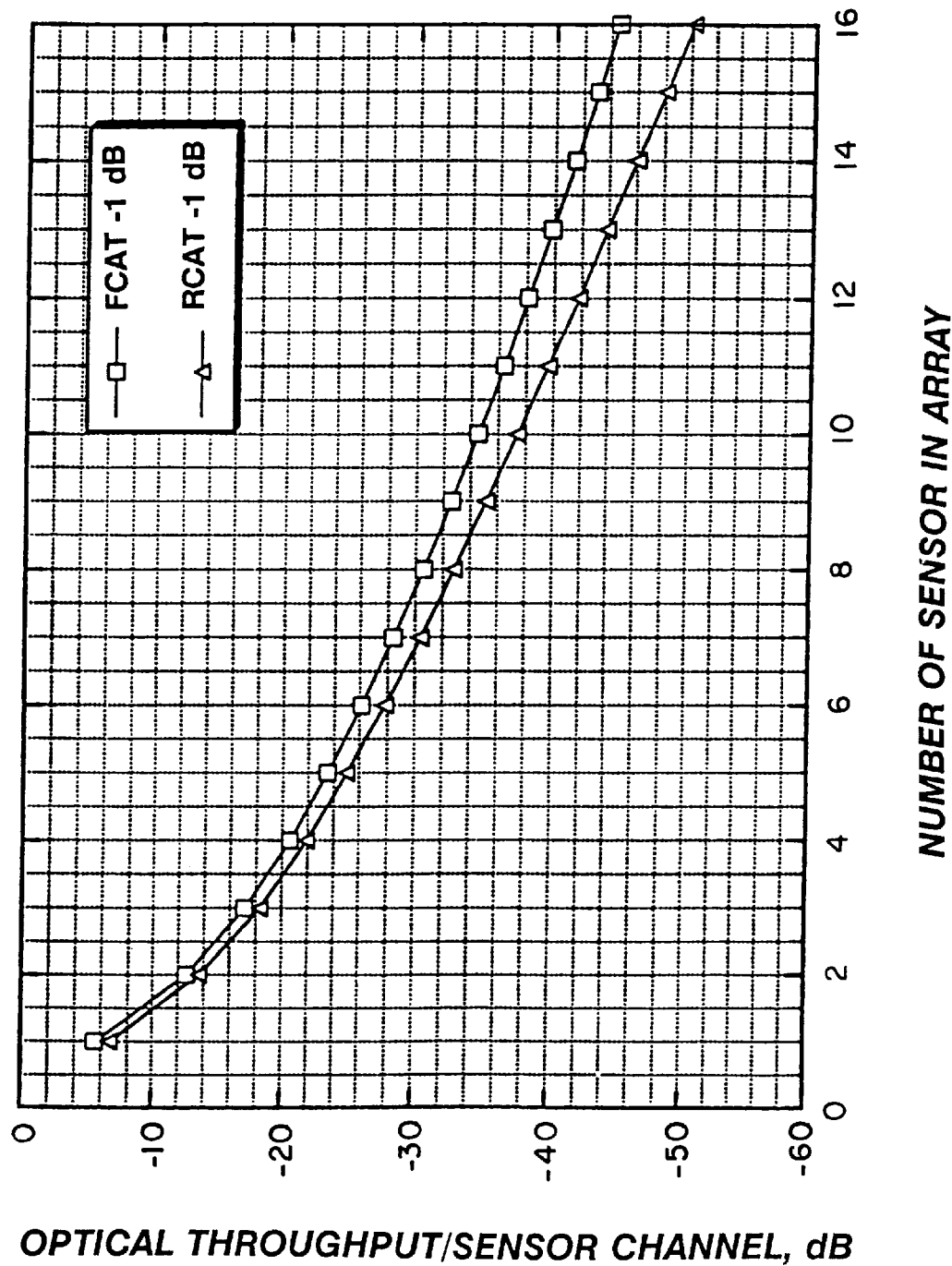
FIG. 7 is a graph of the optical throughput per sensor channel for both an RCAT array and for an FCAT ladder network according to the present invention for the same system loss values.

FIG. 7 directly compares the performance of an RCAT system and an FCAT system in terms of the optical throughput per sensor channel for the same −1 dB system loss per section. As FIG. 7 demonstrates, a 16-sensor FCAT array has roughly 5 dB more throughput per sensor channel than a 16-sensor RCAT array.

The FCAT ladder network, in contrast to an RCAT ladder network, avoids the requirement for the use of couplers with very low coupling ratios when losses, or the number of sensors, become large. For example, in the case of a 16 sensor RCAT ladder network with 1 dB link loss, the first coupler 1 has a splitting ratio of 0.65%. This coupler 1 could probably only be specified at manufacture as a 0.5 to 0.8% coupler. This represents a possible 25% variation in the power level coupled to the first sensor. The level of outputs from the sensors in RCAT array can thus be significantly different unless the coupler splitting ratios are precisely defined.

In contrast, the FCAT ladder network of the present invention does not require the tailored coupling ratios, and the splitting value of the first coupler is fixed at 6.25%. This coupler could probably be specified at manufacture with a ratio of 6.25%±0.25%, indicating about a 4% tolerance. This is a much lower variation in coupler splitting ratio than with the RCAT system, and results in a more uniform level of sensor outputs from the FCAT system.

The FCAT architecture is particularly suitable for use in remotely powered array systems, extending over long distances. Additionally, it is noted that each sensor in the structure could be replaced by a group, or sub-array, of sensor elements if desired.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A forward-coupled fiber optic sensor array system comprising:

an input optical fiber section;

an output optical fiber section;

a plurality of fiber optic input couplers optically connected in series through first optical fiber sections having a uniform length, a first one of said plurality of input couplers being optically connected to said input optical fiber section;

a plurality of fiber optic output couplers optically connected in series through second optical fiber sections, a last one of said plurality of output couplers being optically connected to said output optical fiber section; and a plurality of fiber optic acoustic sensors, each of said sensors being optically connected between a corresponding respective one of said input couplers and a corresponding respective one of said output couplers so as to form a forward-coupled fiber optic sensor array system topology (FCAT) ladder network, and so that all optical paths defined between said input and output optical fiber sections by said input and output couplers, said first and second optical fiber sections and said acoustic sensors have the same number of optical fiber sections and approximately the same number of optical connections; and each of said plurality of input couplers having a coupler splitting ratio, and said coupler splitting ratios being selected for optimum optical performance independent of light losses in the system.

2. A forward-coupled fiber optic sensor array system comprising:

an input optical fiber section;

an output optical fiber section;

a plurality of fiber optic input couplers optically connected in series through first optical fiber sections having a uniform length;

a plurality of fiber optic output couplers optically connected in series through second optical fiber sections; and a plurality of fiber optic acoustic sensors, each of said sensors being optically connected between a corresponding respective one of said input couplers and a corresponding respective one of said output couplers so as to form a forward-coupled fiber optic sensor array system topology (FCAT) ladder network, and so that all optical paths defined between said input and output optical fiber sections by said input and output couplers, said first and second optical fiber sections and said acoustic sensors have the same number of optical fiber sections and approximately the same number of optical connections.

3. A forward-coupled fiber optic sensor array system, as in claim 2, wherein a first one of said plurality of input couplers being optically connected to said input optical fiber section.

4. A forward-coupled fiber optic sensor array system, as in claim 2, wherein a last one of said plurality of output couplers being optically connected to said output optical fiber section.

5. A forward-coupled fiber optic sensor array system, as in claim 2, whereas of each of said plurality of input couplers has a coupler splitting ratio, and said coupler splitting ratio being selected for optimum optical performance independent of light losses in the system.

\* \* \* \* \*